Oct. 12, 1937. C. W. WALKER Re. 20,530
MILK BOTTLE WASHING MACHINE
Original Filed March 22, 1934 2 Sheets-Sheet 1
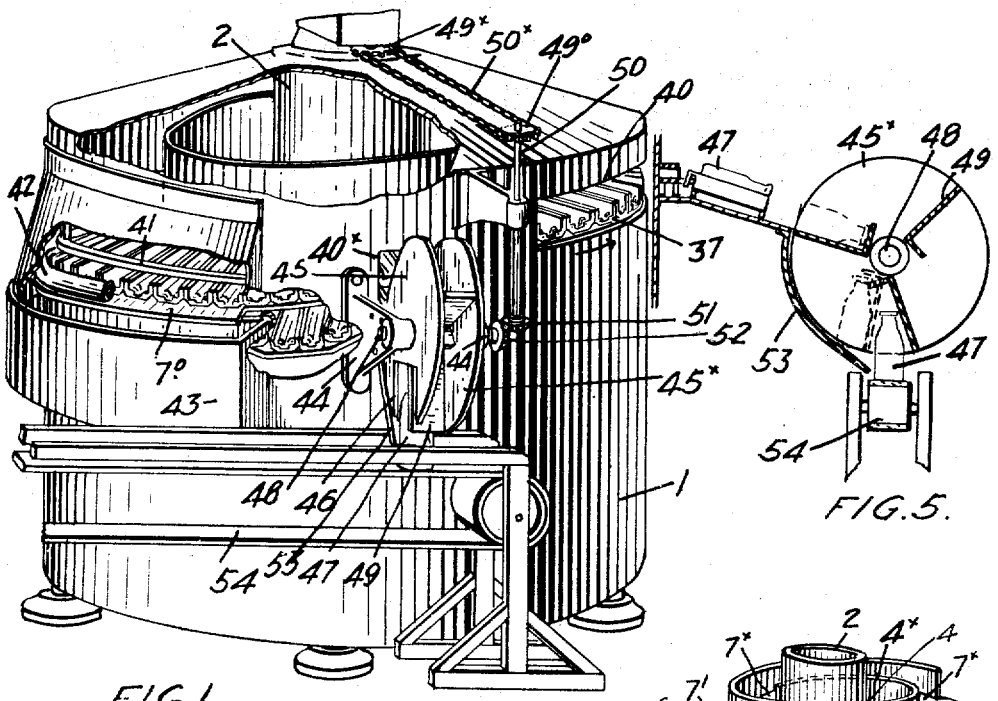
FIG. 1.
FIG. 5.
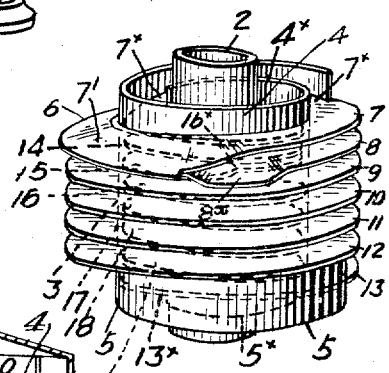
FIG. 4.
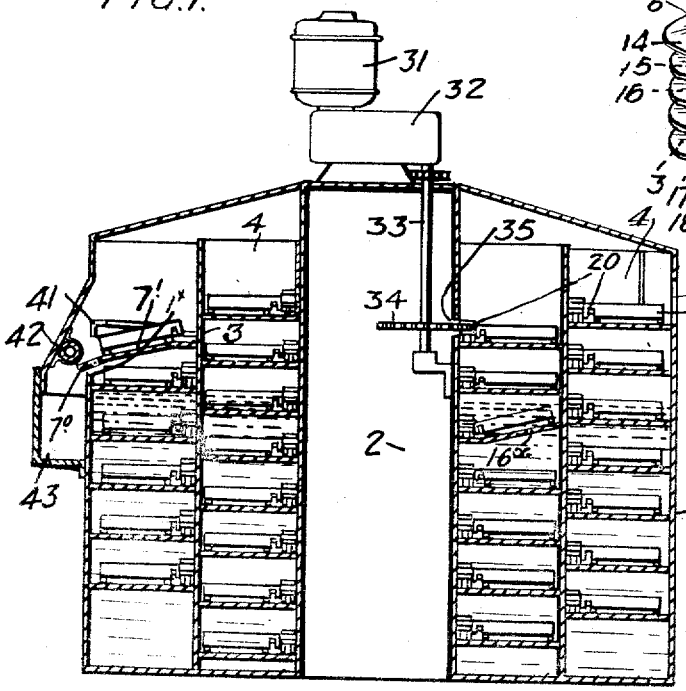
FIG. 2
Inventor.
C. W. Walker
by H. J. Dennison
Attorney.

Oct. 12, 1937. C. W. WALKER Re. 20,530
MILK BOTTLE WASHING MACHINE
Original Filed March 22, 1934 2 Sheets-Sheet 2
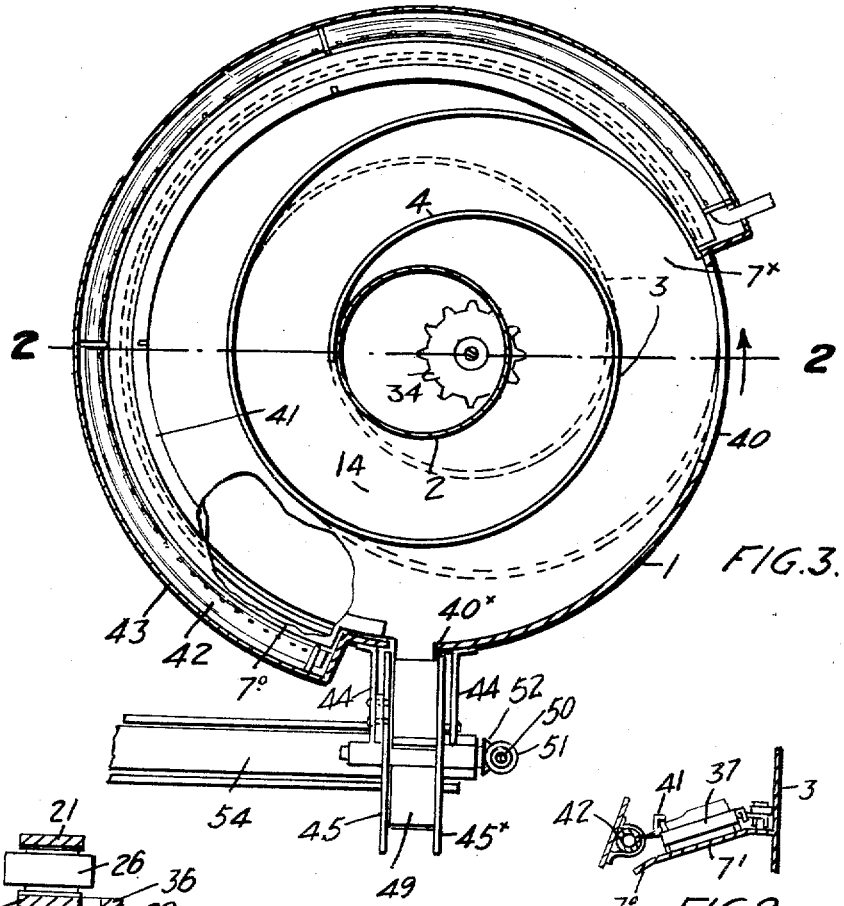
FIG. 3.
FIG. 9.
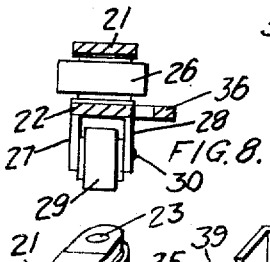
FIG. 8.
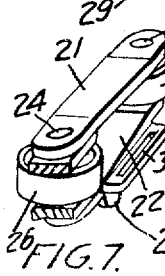
FIG. 7.
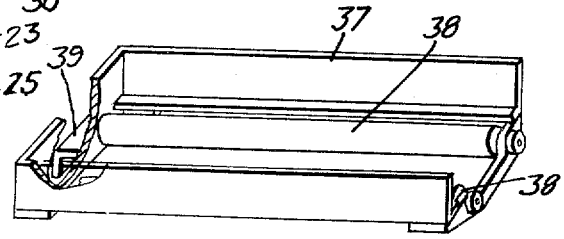
FIG. 6.
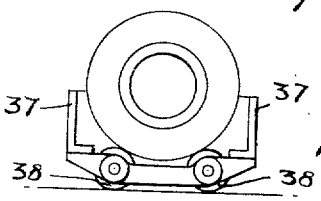
FIG. 6'.
Inventor
C. W. Walker
by H. J. Dennison
Attorney.

Reissued Oct. 12, 1937

Re. 20,530

UNITED STATES PATENT OFFICE 20,530

MILK BOTTLE WASHING MACHINE

Charles Widmer Walker, Toronto, Ontario, Canada, assignor of one-third to Grant A. Edwards, Toronto, Ontario, Canada Original No. 2,011,786, dated August 20, 1935, Serial No. 716,741, March 22, 1934. Application for reissue December 30, 1936, Serial No. 118,306

14 Claims. (Cl. 141—7)

My invention relates to improvements in milk bottle washing machines, and the object of the invention is to devise a simple and compact machine which will not be costly to manufacture having a minimum number of moving parts and which will, therefore, not be liable to become out of order, and it consists essentially of the arrangement and construction of parts as hereinafter more particularly explained.

Figure 1 is a perspective view of my machine partially broken away to exhibit the interior construction thereof.

Figure 2 is a cross sectional view through my machine on line 2—2 of Figure 3.

Figure 3 is a sectional plan view taken through the feed orifice and with the bottle carrier removed.

Figure 4 is a perspective detail of the spiral runway on a reduced scale.

Figure 5 is a sectional detail through the delivery mechanism.

Figure 6 is an enlarged perspective detail of one of the bottle carriers.

Figure 6′ is an end view of the carrier showing a bottle supported therein.

Figure 7 is an enlarged perspective detail of one of the links of the carrier chain to which the bottle carriers are connected.

Figure 8 is a transverse section through the link illustrated in Figure 7.

Figure 9 is a detail showing the bottle in the rinsing position.

Like characters of reference indicate corresponding parts in the different views.

1 indicates a tank containing a strong alkali solution. 2 is a tube located centrally in the tank 1. 3 is a concentric tube, the wall of which is located midway between the external periphery of the tube 2 and the internal periphery of the tank 1.

4 is a volute guide wall arranged at the upper end of the tubular structure and curving inwardly from the inner wall of the tank 1 to the outer wall of the central tube 2 to form a spiral channel leading from the exterior to the interior of the tube 3. 5 is a volute guide wall arranged at the lower end of the tubular structure and curving outwardly from the central tube 2 to the wall of the tank 1 in a curvature the reverse to that of the wall 4 to form a spiral channel leading from the interior to the exterior of the tube 3.

6 is an endless spiral flange forming a runway, the outer or ascending portion of which winds upwardly around the exterior periphery of the tube 3 as indicated by the convolutions 7 to 13. The end of the uppermost convolution 7 then leads between the convolutions of the volute wall 4 as indicated at $7^x$ in Figures 3 and 4, and the flange then winds downwardly between the tubes 3 and 2 and the end of the lowest convolution leads outwardly through the spiral channel formed by the guide wall 5 and connects with the lowermost convolution 13 of the ascending spiral.

By this means an endless trackway is formed for an endless chain 20 which winds upwardly from the bottom of the inner spiral channel around the outer wall of the tube 3 and downwardly from the outer spiral channel around the outer wall of the tube 2.

The links forming the chain 20 are illustrated in Figure 7 and comprise the bar plates 21 and 22 connected together by bolts 23 and 24 on which are revolubly mounted rollers 25 and 26, which engage in rolling contact against the walls of the tubes 2 and 3 and the wall portions $4^x$ and $5^x$ of the volute guide walls 4 and 5 respectively. The lower bar plate 22 is provided with lugs 27 and 28 between which is revolubly mounted a roller 29 on a shaft 30 to travel on the upper faces of the spiral flange convolutions 7 to 13 and 14 to 19 to support the weight of the chain.

31 is a motor (see Figure 2), the shaft of which is connected through a suitable reduction gear contained in the casing 32 to a shaft 33 on which is secured a driving gear 34 engaging the links of the chain 20 through a slot 35.

The lower bar plate 21 of each link is provided with a slotted lug 36. 37 is a bottle carrier comprising a rectangular frame of suitable construction at each side of which is journalled a roller 38 on which the milk bottle is laid. The rollers 38 bear upon the upper faces of the spiral 6 and form a rolling support for the carrier, a carrier being freely connected to each link by a hook 39 engaging in the slotted lug 36 to allow of a swinging movement in a vertical plane.

40 is a slotted opening in the wall of the tank 1 through which the bottles are manually fed, one bottle being laid in each carrier 37. The upper flange convolution 7 has a portion $7^1$ which is downwardly inclined towards its outer edge, such inclined portion extending from a point adjacent the remote end of the feed slot 40 to a point adjacent the discharge opening $40^x$.

41 is an angle bar curved concentric to the centre of the machine against which the bottle mouth bears as indicated in Figure 9. 42 is a perforated tube also concentric with the centre of the machine and so positioned as to inject water into each bottle mouth to rinse the same, while it is travelling in the downwardly inclined position, so that the rinse water will be readily discharged therefrom. The tube, if desired, may be divided into sections, each section separately supplied with water at gradually decreasing temperatures. The inclined portion $7^1$ is provided with an extension lip $7^0$ extending through an opening $1^x$ in the wall of the tank 1 so as to shed the rinsing water into a receptacle 43 from which it is drained preventing the water entering the alkaline solution and diluting it.

The convolution 8 is provided with a short downwardly inclined portion $8^x$ which is also located above the fluid level of the tank so that the alkaline solution is drained therefrom, the bottle tending to invert. The convolution 16 of the inner spiral is inclined upward as indicated at $16^x$ at a point just below the level of the solution so that any air imprisoned in the bottle by the inflowing solution will have a chance to escape.

Opposite the discharge orifice $40^x$ is located the discharging mechanism comprising a pair of brackets 44 to one of which is secured a stationary disc 45 having an opening 46 for the passage of the bottles 47. 48 is a shaft mounted in the brackets 44, and to which is secured a revolving disc $45^x$ carrying bottle receivers 49 secured thereto at one edge and extending closely adjacent to the disc 45 at the opposite edge. The shaft 48 is driven from the shaft 33 by means of the shaft 50 driven at one end by the sprockets $49^x$ and $49^0$ and sprocket chain $50^x$ and connected at its opposite end by the bevel gears 51 and 52 to the shaft 48.

53 is a guide plate, the upper portion being concentric to the discs 45 and $45^x$, the lower portion extending tangentially so as to allow the bottle bottom to slide easily onto the travelling conveyor 54 to be conveyed to a suitable point.

Having described the principal parts involved in my device, I will briefly describe the operation of the same.

The soiled milk bottles are passed through the feed slot 40 and placed in the bottle carriers as they travel in the direction of the arrow past such slot driven by the gear 34. As they continue to travel in this direction they are carried over the flange portion $7^x$ into the descending or inner spiral of the runway, passing down the same into the solution. As they enter the solution, the bottle mouth is tipped upward by the inclined portion $16^x$ releasing air contained in the bottle. The bottles then travel successively to the bottom of the descending spiral and then pass outward by the volute 5 into the ascending spiral formed around the exterior of the tube 3. When they are carried upward by the ascending spiral above the level of the solution, they are momentarily tipped down at their mouth end as they pass over the downwardly inclined portion $8^x$ so as to empty the alkali solution therefrom into the tank 1 before they are rinsed to prevent waste of the solution.

The bottles then pass up the ascending convolution 7 and are again tipped downward at the mouth to receive water from the jets of the pipe 42, the rinsing water pouring from the bottles over the lip preventing it passing into the alkali to dilute it and directing it into the separate waste receptacle 43.

It will be understood that as each bottle is laid horizontally in the individual carriers 37, the cylindrical body resting upon the rollers 38 is, through the rotating movement of the rollers which rest upon the spiral flange, slowly rotated, thereby subjecting both exterior and interior surfaces thereof to a washing or laving action first by the alkali solution and then by the rinse fluid and, as this rotative movement is continuous throughout the operation, all accumulations on the bottle surfaces will be positively removed, and the bottle when discharged is thoroughly cleansed and ready for filling with whatever liquid it is to contain.

The bottles finally are carried opposite the discharge orifice and are free to slide from the downwardly inclined carriers 37 through the discharge orifice into one of the receivers 49. The revolving of the discharge mechanism is so timed as to receive a bottle in each receiver as the mechanism revolves in the manner above described to discharge the bottle onto the endless conveyor 54 which carries it through the opening 46 to any convenient point.

From this description it will be seen that I have devised a very simple device for washing milk bottles and other containers which is not costly and is compact, easily operated and efficient.

While I have described my invention as particularly applicable to the washing of milk bottles, it will be readily appreciated that other types of bottles, glasses and many forms of containers may be treated therein, and that, while special provision is made for washing the containers carried through the machine, the apparatus with its peculiar arrangement of spiral runways and carriers may be used for the cooking or processing of a variety of goods.

What I claim as my invention is:—

1. A milk bottle washer comprising a solution receptacle having bottle receiving and discharge openings in the wall thereof, a runway element comprising inner and outer spaced apart cylindrical walls within the receptacle, a spiral endless runway consisting of an outer ascending portion extending between the receptacle wall and the outer wall of the element and a descending portion extending between the outer and inner element walls, and means for conveying bottles disposed horizontally and transversely of the runway along such runway from the receiving opening to the discharge opening of the receptacle.

2. A milk bottle washer comprising a solution receptacle, a spiral endless runway consisting of an outer ascending portion and an inner descending portion extending into the solution and a portion of which is inclined upward towards its outer edge for releasing imprisoned air from each bottle as it passes beneath the surface of the solution, bottle carriers, and means for driving the bottle carriers continuously over the runway from a feed to a discharge point.

3. A milk bottle washer comprising a solution receptacle, a spiral endless runway consisting of an outer ascending portion and an inner descending portion extending into the solution the ascending portion being downwardly inclined laterally towards its outer edge at a point above the solution level to discharge solution from each bottle as it passes over such laterally inclined portion, bottle carriers, and means for driving the bottle carriers continuously over the runway from a feed to a discharge point.

4. A milk bottle washer comprising a solution receptacle, a spiral endless runway consisting of an outer ascending portion and an inner descending portion extending into the solution, the ascending portion being downwardly inclined laterally towards its outer edge at a point above the solution level to discharge solution from each bottle as it passes over such laterally inclined portion, bottle carriers, means for driving the bottle carriers continuously over the runway from a feed to a discharge point, and means for automatically rinsing each bottle after the solution is discharged therefrom.

5. A milk bottle washer comprising a solution receptacle, a spiral endless runway consisting of an outer ascending spiral portion and an inner descending spiral portion extending into the solution, an endless sprocket chain guided around the endless runway, means for driving the chain, bottle carriers pivoted to the chain and travelling over the runway from a bottle receiving point to a bottle discharging point, and means for automatically discharging the bottles at the discharge point.

6. A milk bottle washer comprising a solution receptacle having a feed opening, a discharge opening and a rinse water outlet opening above the solution level, a spiral endless runway consisting of an outer ascending portion and an inner descending portion extending into the solution, bottle carriers, means for driving the bottle carriers continuously over the runway to carry the bottles from a point opposite to the feed opening to a point opposite to the discharge opening, a laterally downwardly inclined portion in that portion of the ascending spiral runway opposite to the rinse water outlet opening for depressing the bottle mouths, means for injecting rinse water through the depressed mouths into the bottles, and means for simultaneously guiding the rinse water as it is discharged from the depressed mouths through the rinse water outlet opening.

7. In a milk bottle washer, a spiral runway comprising inner and outer tubes spaced apart, an endless spiral flange including an ascending spiral portion extending around the outer tube and a descending spiral portion extending around the inner tube and a volute guide wall at each end of the outer tube each comprising a central portion carried by the outer tube and concentric therewith, an end portion curving outward from each central portion to the outer edge of each end turn of the ascending spiral flange portion, and an inner portion curving inward from the opposite end of each central portion to the wall of the inner tube, said endless spiral flange including a flange portion extending between the ends of the ascending and descending spiral flange portions and between the outwardly and inwardly curved portions of the volute guide wall to form a guide way for the bottles from the ascending to the descending spiral portion at one end of the runway and from the descending to the ascending spiral portion at the opposite end of the runway.

8. A tank, an ascending concentric outer spiral runway arranged within said tank having a volute portion at the top curving inwardly, a descending concentric spiral runway arranged within the outer runway and leading downwardly from the volute top of said ascending runway and having a volute portion at the bottom connected with the bottom end of said ascending runway, an endless chain arranged at the inward sides of said spiral runways and extending from one to the other at the top and bottom respectively over said volute portions, and carriers connected with said chain at spaced intervals and supported by said runways.

9. A tank, a spiral endless runway arranged within said tank having an ascending portion and a descending portion connected respectively at the top and bottom, an endless chain supported on said runways, means for driving said chain, carriers connected at intervals to said chain, and rollers on said carriers engaging in rolling contact with said runways and presenting surfaces for the rolling support of goods mounted on said carriers.

10. A device as claimed in claim 9 having the rollers mounted longitudinally between the ends of the carriers and directly supporting rotatable objects thereon.

11. A device as claimed in claim 9 in which the carriers are in the form of frames open at the bottom and top and the rollers are arranged in pairs and are spaced apart and mounted to extend between the ends of each of said frames and form rolling supports for the frames.

12. A device as claimed in claim 9 in which the endless chain comprises links mounted on rollers and each having a longitudinal slot, said carriers being in the form of rigid frames each having a hook engaging the slot in a link of the chain.

13. A device as claimed in claim 4 having means for holding the bottles from sliding off the carriers when said carriers are moving over the laterally inclined runway in discharging the solution and rinse water therefrom.

14. A device as claimed in claim 4 having a guide curved concentric to the runway and supported above same opposite the laterally inclined portion to engage and hold the bottles on their carriers when in a downwardly inclined position.

CHARLES WIDMER WALKER.

4

CERTIFICATE OF CORRECTION.

Reissue No. 22,530. August 15, 1944.

FRANCIS M. SELL.

It is hereby certified that error appears in the printed specification of the above numbered patent requiring correction as follows: Page 1, second column, line 19, for that portion of the formula reading "$H_3N$" read --$H_2N$--; line 38, for "diethylamino" read --dimethylamino--; and that the said Letters Patent should be read with this correction therein that the same may conform to the record of the case in the Patent Office.

Signed and sealed this 26th day of September, A. D. 1944.

Leslie Frazer (Seal) Acting Commissioner of Patents.